April 12, 1932.   H. E. TWOMLEY   1,853,788
CONVEYER SYSTEM
Original Filed Feb. 21, 1931
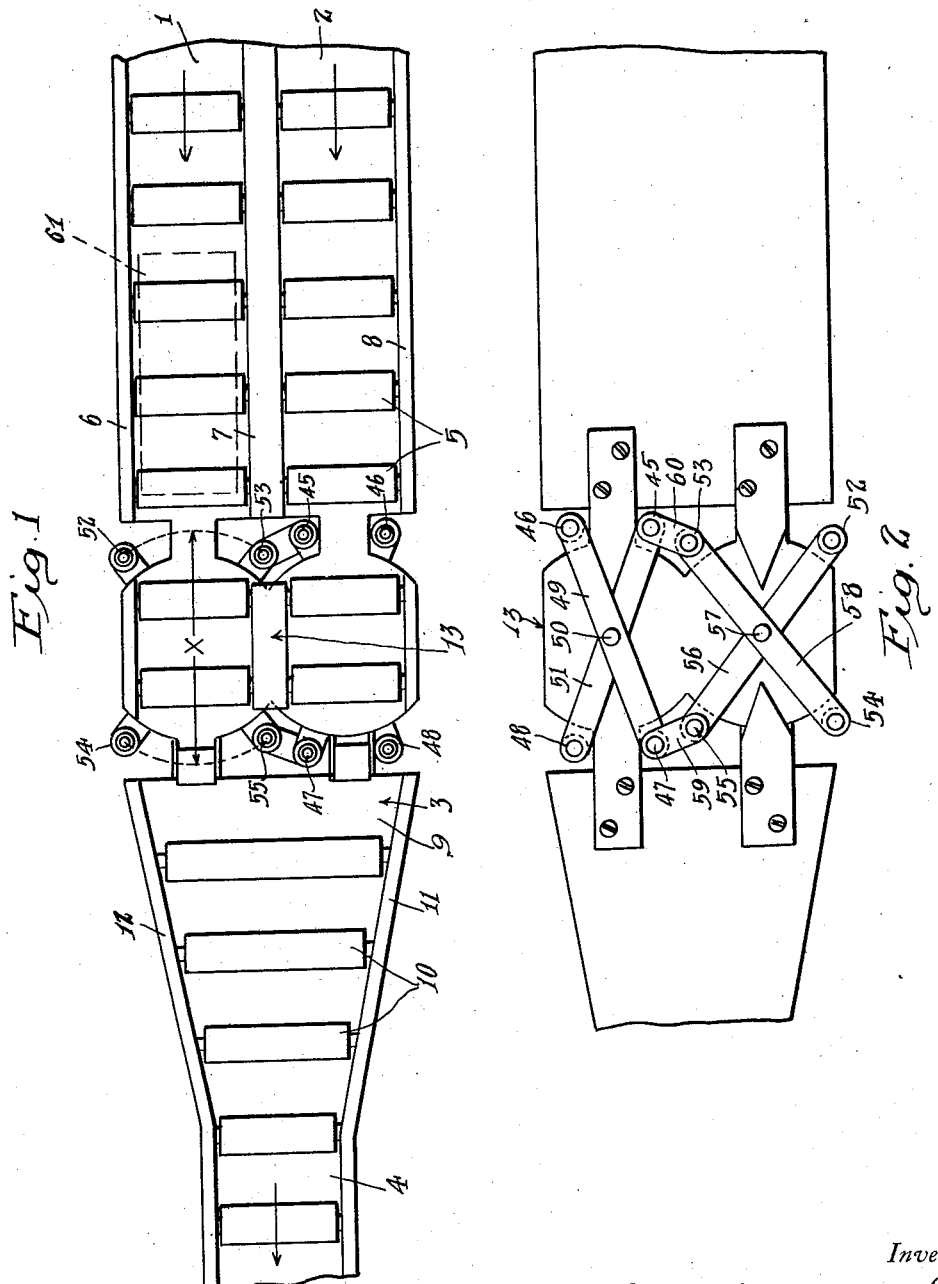
Inventor
Herbert E. Twomley
By Lyon & Lyon
Attorneys Patented Apr. 12, 1932

1,853,788

UNITED STATES PATENT OFFICE

HERBERT E. TWOMLEY, OF RIVERSIDE, CALIFORNIA, ASSIGNOR TO CLARA B. PARKER, OF RIVERSIDE, CALIFORNIA, EXECUTRIX OF THE ESTATE OF GEORGE D. PARKER, DECEASED

CONVEYER SYSTEM

Original application filed February 21, 1931, Serial No. 517,397. Divided and this application filed December 2, 1931. Serial No. 578,467.

My invention relates to roller conveyers and has particular reference to a device for preventing collisions between packages or other articles moving along two separate chutes which terminate in a single opening or continuation of the conveyer system.

This application is a division of my copending application Serial No. 517,397, filed February 21, 1931.

In roller conveyers it is common practice to have conveyers extending from several spaced points to a common conveyer or chute upon which packages or parcels from such different points will be conveyed along the continuation of the chute. Ordinarily, the continuation of the chute is formed to accommodate in its width only the same size of package or parcel as was accommodated by either one of the feeder chutes or conveyers so that it is necessary to provide some means at the junction of the feeder chutes to prevent collision between the parcels arriving from the different conveyers.

It is, therefore, an object of my invention to provide means for a branched conveyer chute to prevent collision between parcels arriving simultaneously at the junction of the chutes.

Another object of my invention is to provide a branched conveyer chute with means for positively stopping parcels on either of the chutes to thereby prevent collision between parcels from different chutes attempting to enter the junction at the same time.

Another object of the invention is to provide a branched conveyer chute with means for positively stopping parcels passing along the chutes to prevent collision thereof at the junction of the chutes, and to insure the clearance of any given parcel entering from one chute before parcels are permitted to enter from the other chute.

Other objects and advantages will be apparent from a study of the following specification, read in connection with the accompanying drawings, wherein Figure 1 is a plan view of a branched conveyer chute of the roller type, provided with parcel engaging devices constructed in accordance with my invention; and Figure 2 is a bottom plan view of the conveyer system shown in Figure 1.

Referring to the drawings, I have illustrated in Figure 1 a branched conveyer as comprising a pair of feeder chutes 1 and 2, a section of which is illustrated, it being understood that these feeder conveyers extend from certain stations in a factory or other establishment where the conveyer is employed, at which stations parcels, boxes, or packages, or other articles, will be placed upon one or the other of the conveyer chutes. While the chutes 1 and 2 are illustrated as being very close together, it is assumed that these two chutes may extend from widely separated points, if desired.

The conveyer chutes 1 and 2 are illustrated as discharging into a junction 3 which constitutes the entrance of a continuation of the conveyer by way of a continuing chute 4. It is assumed that the direction of movement of parcels upon the conveyer is in the direction of the arrows appearing on Figure 1.

The type of conveyer illustrated is that known as a roller conveyer, each of the conveyer chutes being provided with a plurality of rollers 5, which may be driven in any suitable manner and which are arranged with their axes substantially parallel to each other and at right angles to the direction of motion of parcels to be conveyed thereover. Parcels are prevented from slipping from the rollers 5 as by means of the guide rails 6, 7 and 8, of which rail 7 is indicated in Figure 1 as constituting a joint rail for both chutes 1 and 2.

The junction 3 is illustrated as comprising a substantially funnel-like conveyer, its inner or approaching end 9 being constructed with a width equal to the sum of the width of the feeder chutes 1 and 2 so that provision is made to permit simultaneous entry of parcels from both of the chutes 1 and 2. This junction 3 is also illustrated as being provided with rollers 10, each of which is mounted and driven similarly to those indicated at 5, but the length of which corresponds substantially to the width of the conveyer junction section.

As will be readily apparent from an inspection of Figure 1, the guides 11 and 12, constituting the sides of the junction 3, are positioned angularly relative to each other to guide parcels entering the junction into the proper position to enter the continuing chute 4. The continuing chute 4 is constructed similarly to either the chute 1 or 2, and is illustrated as being of a width substantially equal to the width of either one of the feeder chutes.

If parcels were permitted to pass simultaneously from both of the chutes 1 and 2 into the junction 3, it would be readily apparent that these parcels would engage the guides 11 and 12 and would be brought into contact with each other with the result that the junction 3 would become blocked and thus prevent any of the parcels from passing into the continuing chute 4. To prevent such blocking or jamming of the junction 3, and to prevent collision of the parcels, I have illustrated a stopping device which comprises a pair of rollers 45 and 46 associated with the feeder chute 2, and a corresponding set of rollers 47 and 48 also associated with the feeder chute 2 but spaced from the rollers 45—46 in the direction of motion of the parcels over the chute.

By referring particularly to Figure 2, it will be observed that rollers 46 and 47 are mounted upon opposite ends of a lever 49, which lever is pivoted at its center 50 to the underneath side of the floor of the conveyer. In like manner rollers 45 and 48 are mounted at opposite ends of a second lever 51 also pivoted at its center at 50 to the underneath side of the conveyer. The entry of a parcel from chute 2, impacting the rollers 45 and 46, will move these rollers away from each other to permit the parcel to pass therethrough, while the rollers 47 and 48 will be simultaneously moved apart to permit the passage of the parcel through these rollers.

Referring again to Figure 1, it will be observed that a similar group of rollers is associated with chute 1, the rearmost rollers being designated by the reference characters 52 and 53, while the foremost rollers are indicated by the reference characters 54 and 55. Rollers 52 and 55 are mounted upon opposite ends of a lever 56 pivoted at its center 57 while rollers 53 and 54 are mounted upon opposite ends of a lever 58 pivoted at its center 57. The entry of a parcel from chute 1 will cause the rollers 52 and 53 to be moved apart, thus causing a simultaneous displacement of the rollers 54 and 55.

By referring particularly to Figure 2, it will be observed that the levers 49 and 56 are connected together at their adjacent ends by means of a link 59, while levers 51 and 58 are similarly connected at their adjacent ends by means of a link 60 so that displacement of rollers 52, 53 causes a corresponding contraction of rollers 45 and 46, or, oppositely, displacement of rollers 45 or 46 will cause contraction of rollers 52 and 53.

The operation of this form of the device is as follows: A parcel approaching upon chute 1, such as that indicated at 61, will impact rollers 52 and 53, causing displacement thereof. The displacement of rollers 52 and 53 causes a corresponding displacement of rollers 54 and 55, as hereinbefore described, as well as causing a contraction of rollers 45 and 46 so that the passage from chute 2 is obstructed to prevent the entry of a parcel from this chute to the junction 3.

The parcel which engaged and operated rollers 52 and 53 will pass into the junction and in doing so will enter between rollers 54 and 55 holding these rollers in the position indicated in Figure 1, and thereafter holding rollers 45 and 46 in obstructing position until the parcel has passed beyond rollers 54 and 55. By spacing the sets of rollers 52—53 and 54—55 in the direction of movement of the parcel, a distance indicated by the arrow X which is substantially the length of one of the parcels ordinarily conveyed by the system, it will be apparent that before a parcel can enter the junction from the branch conveyer 2, the parcel from chute 1 must have cleared both sets of rollers, thus insuring that the parcel from branch conveyer 2 cannot enter the intersection until there is a sufficient clearance for it.

Assuming that while the first parcel mentioned was passing through the stopping device another parcel on branch conveyer 2 arrived at the junction, it would be stopped by rollers 45—46, though exerting a pressure against these rollers. Thus as soon as the first parcel cleared the rollers 54—55, the pressing of the second parcel on rollers 45—46 will cause these rollers to separate, allowing the second parcel to enter the junction and at the same time, by reason of the linkage between rollers 45 and 53, the rollers 52 and 53 would be moved into parcel-stopping position.

On the other hand, assuming that the first parcel mentioned was immediately followed by a second parcel, it would enter the space between rollers 52—53 before the first parcels cleared rollers 54—55, and hence all of the parcels on branch conveyer 1 which were closely spaced, would be permitted to pass before any parcel on branch conveyer 2 would be allowed to enter the junction.

It will be further observed that I have provided a system in which not only such jamming is prevented, but also danger of sidewise collision is prevented by insuring the stoppage of parcels from one chute until after parcels in the other chute have moved to such distance as will insure spacing of these parcels from any other parcels entering from the opposite chute.

While I have illustrated and described the preferred embodiment of my invention, I do not desire to be limited to any of the details of construction shown or described herein, except as defined in the appended claims.

I claim:

1. In a conveyer system in which two branch conveyers converge into a single continuing conveyer at a junction, a pair of levers, one for each branch conveyer, each lever pivoted for lateral movement beneath the associated branch conveyer, a pair of parcel engaging devices on each lever, one at each end thereof projecting upwardly into the path of parcels on the associated conveyer, the engagement of a parcel by either of said parcel engaging devices moving said lever about its pivot to move the parcel engaging device out of the path of said parcel, and means interconnecting the levers of said two branch conveyers for causing displacement of the parcel engaging device of one branch conveyer to move the parcel engaging device of the other branch conveyer into parcel engaging position.

2. In a conveyer system in which a pair of branch conveyers converge into a single continuing conveyer at a junction, a parcel stopping device for each of said branch conveyers including a pair of levers mounted upon a common pivot for movement in a plane parallel to the surface of the associated branch conveyer, a parcel engaging device on each end of each of said levers forming therewith two pairs of parcel engaging devices spaced in the direction of movement of parcels on the conveyer and operable by the engagement of a parcel with the first pair to move the levers to withdraw both sets of rollers from parcel stopping position and operable by the entry of the parcel between the second pair to hold the engaging devices out of parcel stopping position, and means interconnecting the levers with the stopping devices on both of said branch conveyers for causing movement of one of the stopping devices out of stopping position to move the other stopping device into stopping position.

3. In a conveyer system in which a pair of branch conveyers converge into a single continuing conveyer at a junction, a parcel stopping device for each of said branch conveyers including a pair of levers mounted upon a common pivot for movement in a plane parallel to the surface of the associated branch conveyer, a parcel engaging device on each end of each of said levers forming therewith two pairs of parcel engaging devices spaced in the direction of movement of parcels on the conveyer and operable by the engagement of a parcel with the first pair to move the levers to separate said levers and permit the passage of a parcel therebetween, and means interconnecting the levers of the stopping devices on both of said branch conveyers to cause separation of the engaging devices on one branch conveyer to cause the corresponding pair on the other conveyer to be moved into parcel stopping position.

4. In a conveyer system in which a pair of branch conveyers converge into a single continuing conveyer at a junction, a parcel stopping device for each of said branch conveyers including a pair of levers mounted upon a common pivot for movement in a plane parallel to the surface of the associated branch conveyer, rollers on each end of each of said levers forming therewith two pairs of rollers spaced in the direction of movement of parcels on the conveyer and operable by the engagement of a parcel with the first pair to move the levers to withdraw both sets of rollers from parcel stopping position and operable by the entry of the parcel between the second pair to hold the engaging devices out of parcel stopping position, and means interconnecting the levers with the stopping devices on both of said branch conveyers for causing movement of one of the stopping devices out of stopping position to move the other stopping device into stopping position.

Signed at Riverside, California, this 24th day of November, 1931.

HERBERT E. TWOMLEY.